United States Patent [19]
Boegel et al.

[11] Patent Number: 5,440,697
[45] Date of Patent: Aug. 8, 1995

[54] METHOD AND APPARATUS FOR SIMULATING I/O DEVICES

[75] Inventors: Mark A. Boegel; Douglas O. Bolstad; Stephen A. Knight; Harvey G. Kiel, all of Rochester; Robert R. Nelson, Oronoco; Pamela A. Wright, Rochester, all of Minn.

[73] Assignee: International Business Machines Corporation, Armonk, N.Y.

[21] Appl. No.: 138,602

[22] Filed: Oct. 18, 1993

Related U.S. Application Data

[63] Continuation of Ser. No. 781,460, Oct. 23, 1991, abandoned.

[51] Int. Cl.$^6$ ............................................. G06F 13/10
[52] U.S. Cl. .................................. 395/500; 395/828; 395/883; 395/183.09; 395/309
[58] Field of Search ............... 395/325, 275, 500, 375, 395/650, 200, 575

[56] References Cited

U.S. PATENT DOCUMENTS

| | | | |
|---|---|---|---|
| 3,932,843 | 1/1976 | Trelut et al. | 395/500 |
| 4,031,517 | 6/1977 | Hirtle | 395/500 |
| 4,040,021 | 8/1977 | Birchall et al. | 395/550 |
| 4,484,266 | 11/1984 | Becker et al. | 395/500 |
| 4,814,983 | 3/1989 | Catlin | 395/500 |
| 4,885,681 | 12/1989 | Umero et al. | 395/700 |
| 4,901,260 | 2/1990 | Lubachevsky et al. | 364/578 |
| 4,956,787 | 9/1990 | Ito et al. | 364/474.24 |
| 4,985,860 | 1/1991 | Vlach | 364/578 |
| 5,088,033 | 2/1992 | Binkley et al. | 395/500 |
| 5,093,776 | 3/1992 | Morss et al. | 395/500 |
| 5,097,412 | 3/1992 | Orino et al. | 395/500 |
| 5,129,064 | 7/1992 | Fogg, Jr. et al. | 395/275 |

FOREIGN PATENT DOCUMENTS

| | | | |
|---|---|---|---|
| 2494869 | 11/1981 | France | G06F 13/00 |
| 9212480 | 7/1992 | WIPO | G06F 13/12 |

OTHER PUBLICATIONS

IBM Technical Disclosure Bulletin vol. 35, No. 2, Jun. 1992, Armonk, N.Y., US pp. 230–232 "Non-Invasive Automation of Softwre Test With Shared Peripherals".
Patent Abstracts of Japan vol. 14, No. 402 (P-1099) 30 Aug. 1990 & JP-A-02 155 050 (NEC Corp.) 14 Jun. 1990 *abstract*.
M. J. Corrigan, et al; IBM Technical Disclosure Bulletin vol. 33, No. 7, Dec. 1990, "Adopting Live Environment for Simulator Debug/Test".
A. Poursepanj, IBM Technical Disclosure Bulletin vol. 33, No. 2, Jul. 1990, "Run-Time Software Architecture for a Workstation-Based Hardware Simulator".

Primary Examiner—Jack B. Harvey
Assistant Examiner—Glenn A. Auve
Attorney, Agent, or Firm—Roy W. Truelson

[57] ABSTRACT

A computer system comprises a CPU, a main memory, and plurality of I/O Processors (IOPs), coupled to each other by a system I/O bus. The IOPs perform slave processing functions relating to I/O devices. A simulation protocol is defined for the IOPs, whereby the host CPU can command an IOP to execute a simulation script. The simulation script defines one or more I/O devices to be simulated, and specifies a simulated workload associated with the devices. The IOP executes the simulation script by sending simulated input streams to the host and receiving output destined for the simulated I/O devices from the host on the system I/O bus. An IOP may simulate multiple I/O devices, and may simulate I/O devices concurrently with servicing real I/O devices. In typical use, one or more applications programs will execute on the CPU concurrently with the execution of one or more simulation scripts in the IOPs attacked to the system I/O bus. The behavior of the system under such conditions can be used for capacity planning forecasts, for developing and debugging the application software, for reproducing and diagnosing intermittent error conditions, or for performing other tasks in which it is necessary to determine the characteristics of the system under hypothetical conditions.

22 Claims, 8 Drawing Sheets

SIMULATOR CONTROL BLOCK FORMAT — 303

| Field Name | Byte location | Data |
|---|---|---|
| Block Length | 0 - 1 | X '0036' |
| Device ID | 2 | X 'C2' |
| Model ID | 3 | X '80' |
| Keyboard ID | 4 | X '02' |
| Ext Keybd ID | 5 | X '00' |
| Device Addr | 6 | X '18' |
| Delay Time | 7 - 8 | X '012C' |
| Stream Count | 9 | X '04' |
| Data Stream Control Blocks (3 or more) (Fig. 3C) | 10 - (9+11*N) | [BLOCK A] |
| | | [BLOCK B] |
| | | [BLOCK C] |
| | | [BLOCK D] |
| End Byte | 10+11*N | X 'FF' |

FIG. 3B

DATA STREAM CONTROL BLOCK FORMAT — 330

| Field Name | Byte location | Data |
|---|---|---|
| Script Length | 0 - 1 | X '02D6' |
| Offset | 2 - 5 | X '0000018D' |
| Keying Rate | 6 | X '02' |
| Time Multiplier | 7 | X '04' |
| Loop Count | 8 - 9 | X '000A' |
| End Byte | 10 | X 'FE' |

FIG. 3C

DATA STREAM SCRIPT FORMAT

| Field Name | Byte location | Data |
|---|---|---|
| Start Command | 0 - 15 | [STRT CMD] |
| Data Stream | 15 - M | [STREAM OF 1-BYTE KEYSTROKES AND CMDS] |
| End Command | M+1 - M+5 | [END CMD] |

DATA STREAM COMMAND FORMAT

| Field Name | Byte location | Data |
|---|---|---|
| Escape | 0 | X '00' |
| Command Length | 1 | X '10' |
| Command Code | 2 | X '00' |
| Opt Cmd Parms | 3 - (K+2) | [VARIABLE] |
| Opt Cmd Code | K+3 | X '00' |
| Command Length | K+4 | X '10' |
| Escape | K+5 | X '00' |

METHOD AND APPARATUS FOR SIMULATING I/O DEVICES

This application is a continuation of U.S. patent application Ser. No. 07/781,460 filed Oct. 23, 1991, now abandoned.

FIELD OF THE INVENTION

The present invention relates to data processing system design, and in particular to a design for supporting the simulation of physical devices attached to a computer system and workloads imposed on the system.

BACKGROUND OF THE INVENTION

Modern computer systems are increasingly being used to perform a large variety of difficult data gathering and analysis tasks. With the growing prevalence and complexity of computers, it is frequently desirable to obtain information and answer questions about the computer system itself. Due to the complexity of the machine, it is difficult to obtain useful information purely by manual methods. Since the computer has been used to solve such a large variety of problems, it is only natural that the computer be used for introspective tasks as well. For example, computer systems have been designed with capabilities to diagnose hardware failures, provide performance and usage information, assist debugging of programs, etc.

When solving introspective problems, a computer is often required to answer hypothetical questions. It may need to know how it would respond to a given external workload, how long it would take to run a particular program, what would be the effect of temporary loss of a hardware component, etc. One type of application in which such questions must be answered is the capacity planning application. Capacity planning involves forecasting future workload to be imposed on a computer system. predicting how the system will respond to such workload, and determining how such response may be improved (as by attaching additional hardware to the system). Another such application is hardware and software development, in which it is desirable to know how a system will respond to a hardware or software component under development in a variety of prospective environments. Still another possible application is in defect diagnosis, particularly defect diagnosis of an intermittent error condition, in which re-creation of the intermittent error condition requires that a particular environment be assumed. Another possible application is performance analysis and diagnosis, in which it is necessary to determine how the system behaves under given conditions and how system behavior can be altered.

In theory, it is possible to duplicate the hypothetical conditions with actual hardware running appropriate software on behalf of real users. In reality, such a solution is seldom practicable. For example, a commercial enterprise planning for future expansion may wish to know how its system would respond to increased workload from a larger number of attached terminals and interactive users. In theory it could buy the required equipment, hire the terminal operators, create additional workload for input to the system, and observe the results. In reality, such an approach is prohibitively expensive. In another example, a software development house may wish to know how its software will behave on a particular family of computer systems, under a variety of system configurations and workloads. It could buy all the hardware required to duplicate the various configurations, hire the required number of interactive users, and observe the results; again, this approach would be prohibitively expensive and time consuming. In addition to being prohibitively expensive and time consuming, the duplication of real conditions as described above is frequently undesirable because it is impossible to obtain repeatable results. When real users enter data at a keyboard, there will naturally be some variation in the actual timing of input streams, causing observed results to vary. In some applications, such variation is a serious drawback. For example, a developer who is attempting to diagnose an intermittent error condition will want to establish a repeatable sequence of events by which the error condition can be induced.

Another approach to providing data for hypothetical problems is the use of special purpose hardware simulators, which take the place of attached devices with real users. Such hardware simulators obviate the need for live interactive users, and can be made to generate simulated workload in a repeatable manner. However, hardware simulators are still a very expensive method of providing this information. Typically hardware simulators are more expensive than the devices they replace. As a result, the use of hardware simulators is generally confined to system development laboratories.

It is possible to create simulation software. This software attempts to duplicate the hypothetical conditions by issuing instructions from the central processing unit (CPU), causing simulated workload to be processed by the system. Such software is adequate for some tasks, but often lacks the ability to simulate many conditions on the system. The computer system typically comprises a single CPU, which is coupled to various memory devices and slave processors via one or more communications buses. The slave processors are in turn coupled to I/O devices such as disk drives, interactive workstations, printers, etc., or may be coupled to other slave processors. System behavior will depend not only on the number and type of such devices, but the connection topology as well. Simulation software running in the CPU will not always accurately represent the state of other parts of the system, in particular the slave processors and I/O devices.

When a computer performs introspective tasks, it may obtain some information from the operator, but generally the source of its information is the computer itself. As with any task performed on a computer, the quality of the output information can be no better than the quality of the input. Unfortunately, the computer systems of the prior art lack the ability to obtain accurate information for answering many hypothetical questions at reasonable cost.

SUMMARY OF THE INVENTION

It is therefore an object of the present invention to provide an enhanced method and apparatus for performing introspective tasks on a computer system.

Another object of this invention is to provide an enhanced method and apparatus for simulating devices attached to a computer system.

Another object of this invention is to provide an enhanced method and apparatus for simulating a workload input to a computer system.

Another object of this invention is to increase the accuracy of information in a computer system concerning hypothetical devices and workloads.

Another object of this invention is to reduce the cost of providing accurate information concerning hypothetical devices and workloads in a computer system.

Another object of this invention is to provide an enhanced method an apparatus for performing capacity planning tasks on a computer system.

Another object of this invention is to increase the accuracy of capacity planning forecasts for a computer system.

Another object of this invention to provide an enhanced method and apparatus for developing software for a computer system.

Another object of this invention to provide an enhanced method and apparatus for diagnosing problems in a computer system.

Another object of this invention is to perform computer system device and workload simulations with increased accuracy and repeatability.

A computer system comprises a CPU, a main memory, and a (IOPs), coupled to each other by one or more system I/O busses. The IOPs perform slave processing functions relating to the I/O devices. Each IOP contains a programmable processor. Each I/O device attaches to the system via an IOP, and all communications between it and other elements of the system must pass through the IOP.

A simulation protocol is defined for the IOPs, whereby the CPU executing instructions resident in main memory can command an IOP to execute a simulation script. The simulation script defines one or more I/O devices to be simulated, and specifies a simulated workload associated with the devices. The IOP executes the simulation script by interacting with the system I/O bus as if real I/O devices attached to the IOP were performing the work indicated in the script. For example, if an interactive workstation is being simulated, the IOP may send simulated input data strings to the CPU at intervals, and receive output from the CPU intended for interactive display on the simulated workstation.

It is not necessary that any of the simulated I/O devices actually exist on the system. A single IOP may simulate more than one I/O device, and more than one type of I/O device, and multiple IOPs may simulate multiple I/O devices simultaneously. Real I/O devices may operate concurrently with the simulation, form the same IOP and from different IOPs. Thus, virtually any hypothetical configuration of I/O devices to the system may be simulated.

In typical use, one or more applications programs will execute on the central processing unit concurrently with the execution of one or more simulation scripts in the IOPs attached to the system I/O bus. The IOPs will simulate, through execution of the simulation scripts, input to the applications programs that would be expected from real I/O devices during normal use. The IOPs will also receive and acknowledge output produced by the application programs, destined for the simulated I/O devices. The behavior of the system under such conditions can be used for capacity planning forecasts, for developing and debugging the application software, for reproducing and diagnosing intermittent error conditions, or for performing other tasks in which it is necessary to determine the characteristics of the system under hypothetical conditions.

DETAILED DESCRIPTION OF THE PREFERRED EMBODIMENT

Figure 1:
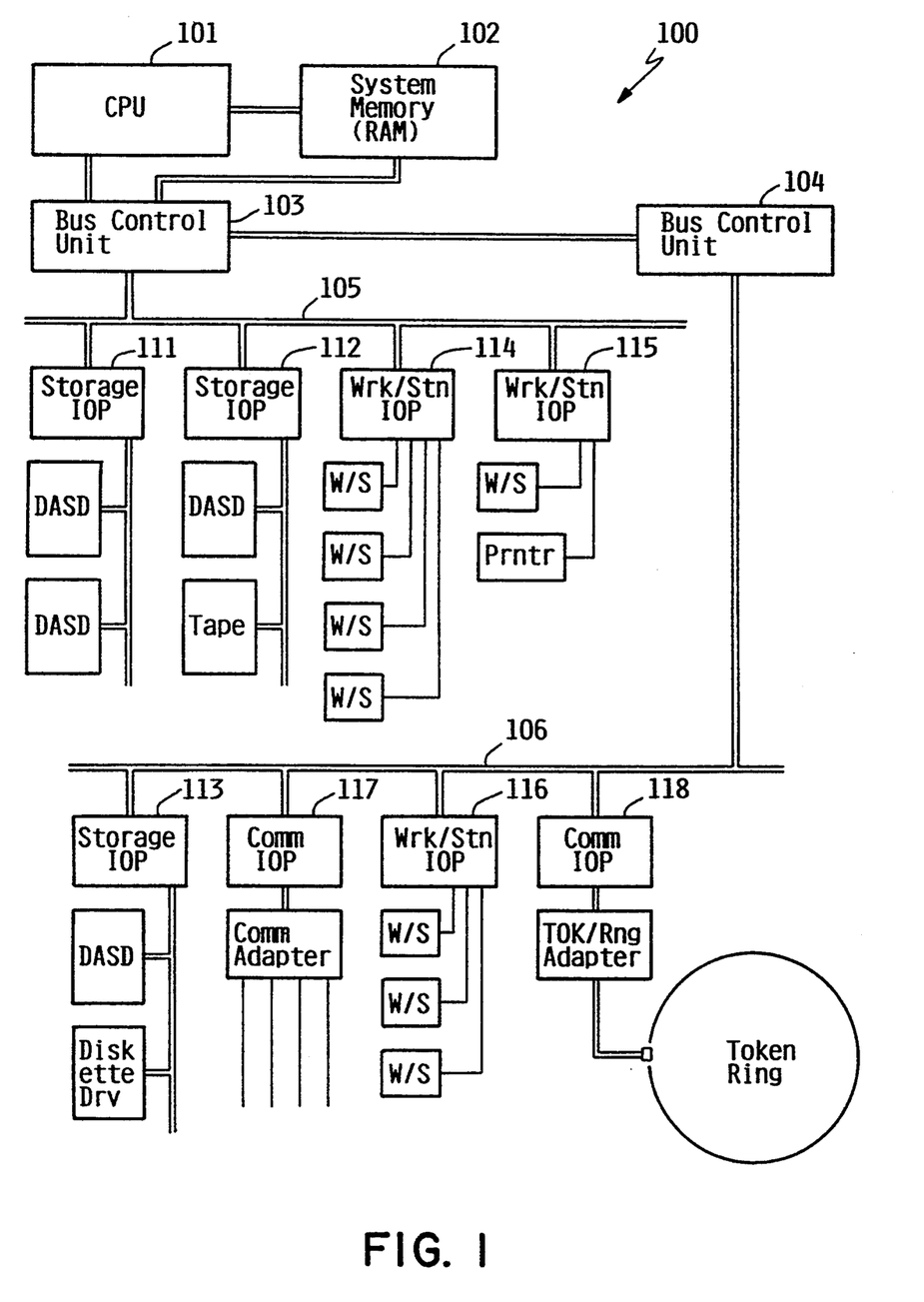
FIG. 1 shows the major hardware components of a computer system having means for simulating I/O devices according to the preferred embodiment of this invention.

A diagram of the major hardware components of a computer system with the capability to simulate I/O devices according to the preferred embodiment of the present invention is shown in FIG. 1. Computer system 100 comprises a central processing unit (CPU) 101 coupled to a system random access memory 102. System memory 102 is in the address space of CPU 101. Although it is shown as a single unit, it should be understood that it may in fact comprise a hierarchy of memory devices, such as a small, relatively fast cache memory and a slower but larger main memory, as is known in the art. CPU 101 and memory 102 are coupled to bus interface unit 103, which arbitrates control of system I/O bus 105 and handles communications between bus 105 and CPU 101 or memory 102. System 100 may comprise more than one system I/O bus. It is shown in FIG. 1 with a second bus interface unit 104 connected to unit 103. The second unit 104 arbitrates control of a second system I/O bus 106, and communicates with the first system I/O bus 105, CPU 101 and memory 102 through bus interface unit 103. Buses 105,106 provide a communications path to a plurality of I/O processors 111–118. I/O processors handle communications with I/O devices, and may control some of the function of such devices. Various different types of I/O processors exist on system 100. Each storage I/O processor 111–113 controls a high-speed I/O channel for servicing storage devices such as magnetic disk drive direct access storage devices (DASD), magnetic tape drive, and diskette drive. Workstation I/O processors 114–116 service local interactive workstations and printer through a plurality of direct local connections. Communications I/O processors 117–118 service remote communications lines and token ring local area network, which may attach to additional I/O devices or other computer systems (which will appear to system 100 as I/O devices). It should be understood that the number, type and configuration of I/O devices, I/O processors and other components may vary. A computer system according to this invention may contain a single system I/O bus or may contain multiple buses. Different types of I/O processors may be present in the system, including multi-function I/O processors which perform the function of more than one type of I/O processor. Different types of I/O devices may be present, such as optical storage devices, optical character readers, voice I/O devices, etc. In addition, system 100 may be a multiprocessor system, comprising a plurality of central processing units. In the preferred embodiment, system 100 is an IBM Application System/400 system.

Figure 2:
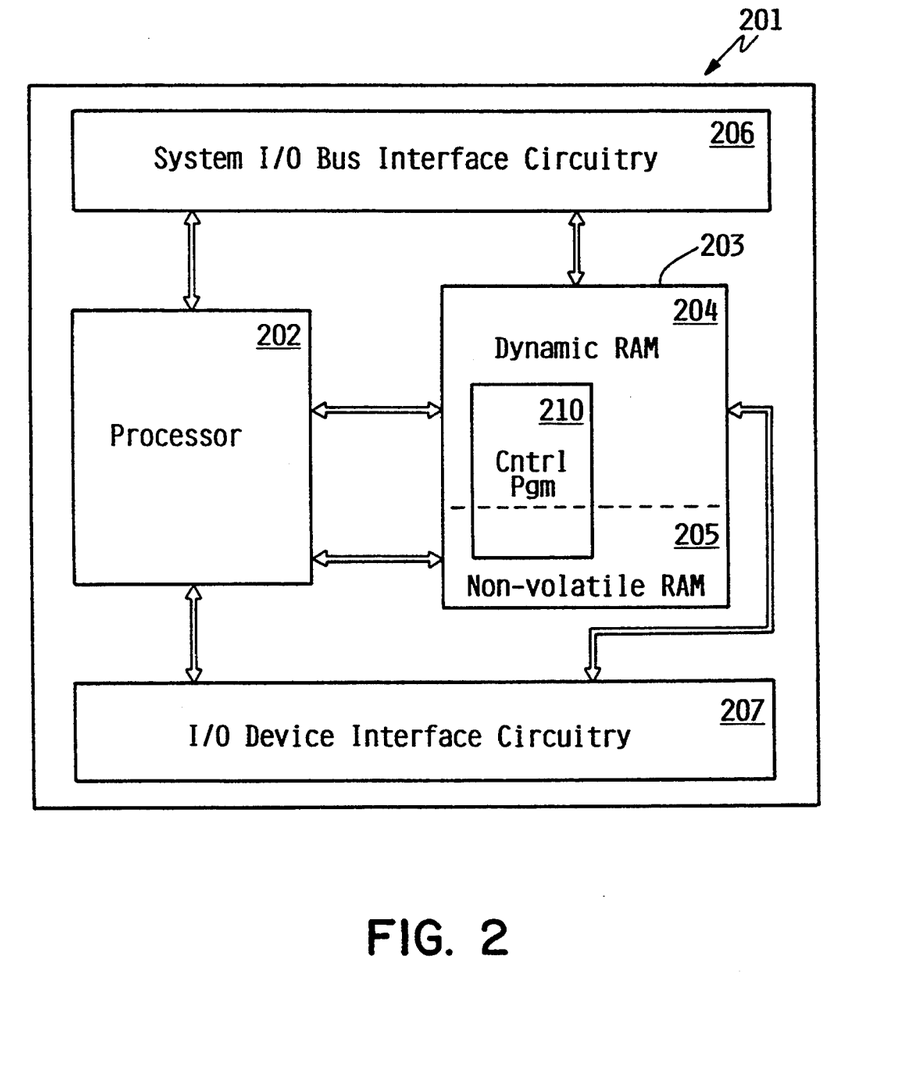
FIG. 2 shows the major components of a typical I/O Processor assembly of a computer system according to the preferred embodiment.

The major components of a typical I/O Processor assembly (IOP) 201 of the preferred embodiment are shown in FIG. 2. The I/O Processor assembly comprises a programmable processor 202, a locally addressable memory 203, system I/O bus interface circuitry 206, and device interface circuitry 207, which are coupled to each other via various communications paths as shown. Locally addressable memory 203 comprises non-volatile portion 205 for storing instructions and vital data required for start-up of the IOP, and dynamic portion 204. The purpose of the IOP is to relieve the CPU of the burden of performing all I/O support by itself. The IOP supports I/O devices by driving high-speed I/O channels, workstation lines, or other communication lines. The IOP may also handle direct memory accesses between the system memory and an I/O device. In the case of workstations, the IOP may also perform various tasks relating to updating the display, such as processing of data keystrokes, cursor movement, scrolling, etc. Thus, the CPU is shielded from the details of such I/O support, and will only hear from an I/O device when the device has some input ready for the system.

In operation, the IOP's programmable processor 202 executes instructions contained in a control program 210 stored in locally addressable memory 203. Memory 203 may also serve as a cache for temporary storage of data being transferred between the system I/O bus and an I/O device. Processor 202 is capable of moving data or issuing commands, status information, etc. to either system I/O bus interface circuitry 206 or device interface circuitry 207. Data may also be moved through memory 203, by-passing processor 202.

In the preferred embodiment, IOP 201 is a workstation controller to which a plurality of interactive workstations may be attached. The IOP maintains a screen buffer and field format table for each workstation it serves in dynamic memory 204. The screen buffer stores the contents of the current display screen at the workstation; the field format table identifies the location of entry fields. The buffer and field format table enable the workstation controller IOP to process certain keystrokes received from the workstation without intervention from the host. For example, cursor movement keystrokes can be processed by updating the screen buffer.

It should be understood that, as used herein, an I/O Processor refers to an entity performing slave processing functions relating to I/O. Many different IOP designs exists in computer systems. In the preferred embodiment, the I/O Processor assembly comprises a single electronic circuit card on which are mounted a plurality of electronic components, said components being electrically connected with each other via various circuits contained in one or more planes of printed circuitry on the circuit card. However, the I/O Processor assembly could be contained in multiple circuit cards, or on a part of a single circuit card, or on a single chip.

From the perspective of that part of the system on the host side of the IOP (i.e., the CPU, system memory, system I/O bus, other IOPs, etc.), the IOP is the I/O device or devices which are attached to it. The CPU and/or main memory receive input data streams from the IOP over the system I/O bus, and send output data streams to the IOP over the system I/O bus. The essence of the invention disclosed herein is that the IOP, by generating and accepting data streams that would normally be received from and sent to an I/O device, can effectively simulate the I/O device to the host part of the system.

According to the preferred embodiment a simulation protocol is defined for the IOPs. This protocol defines a procedure whereby the CPU, executing instructions resident in main memory, can issue a command to an IOP to execute a simulation script. The simulation script, whose format is defined by the protocol, is transferred from the main memory to the IOP for execution. The script is a shorthand description of actions to be taken by the IOP to simulate one or more I/O devices. The script may be viewed as a series of commands which the IOP executes, but each "command" may call for a complex series of actions by the IOP rather than a single instruction executed by the IOP's programmable processor. A portion of the IOP's control program resident in IOP local memory 203 decodes each block of the script and may expand it into the series of actions required of the IOP to simulate the I/O device(s). The IOP then executes the actions called for by the expanded script. Execution involves interacting with the system I/O bus as if real I/O devices attached to the IOP were performing the work meant to be simulated by the script. Data streams typical of what the I/O device would generate are generated by the IOP instead and placed on the system I/O bus, bound for the CPU, main memory, or other system component. Outbound data streams from the host, destined for the I/O device, are received and acknowledged by the IOP and processed by it as if a real I/O device were attached, but no data is in fact transmitted by the IOP to an I/O device.

Figure 3A:
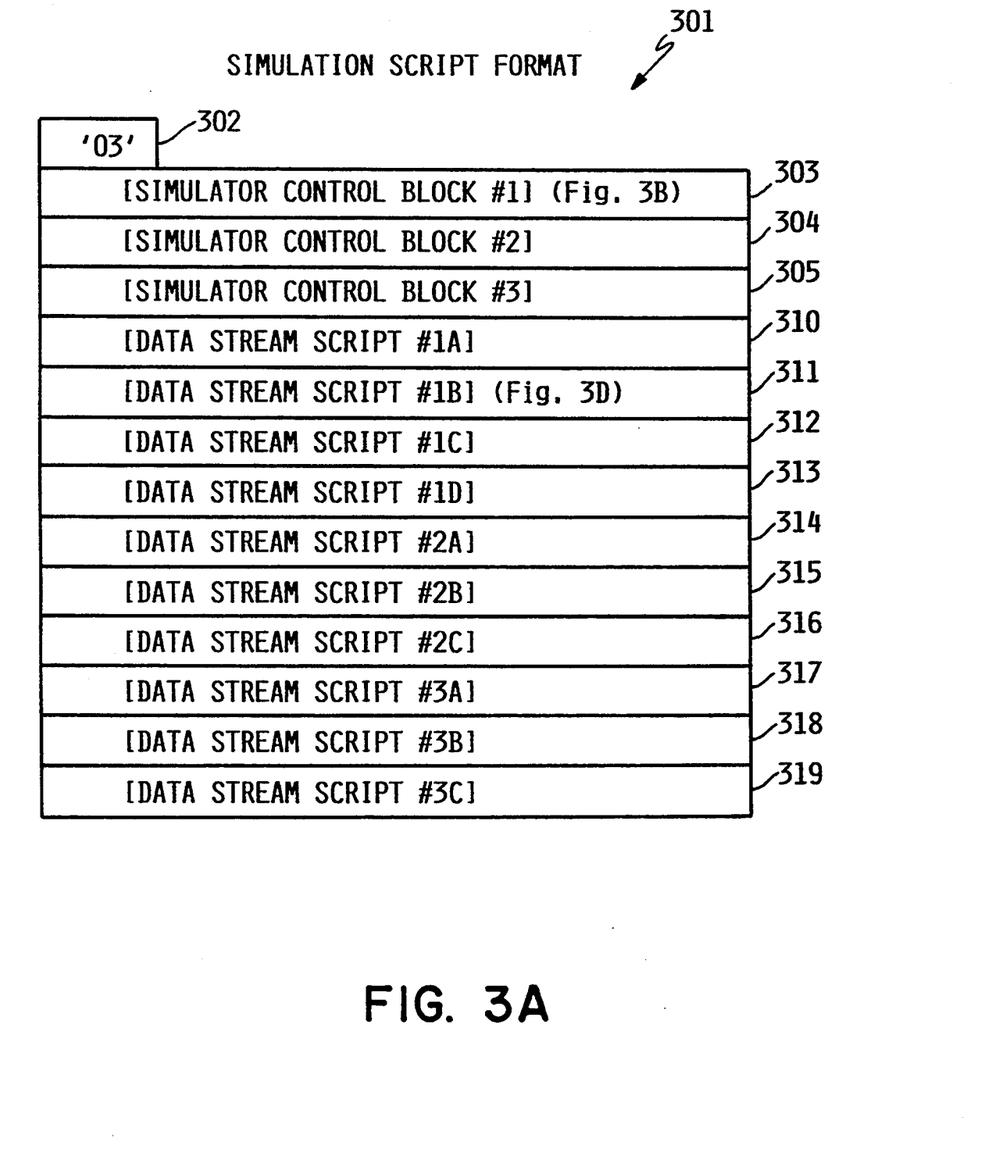
FIG. 3A shows the high-level format of a typical simulation script according to the preferred embodiment.

FIG. 3A shows the high-level format of a typical simulation script 301 according to the preferred embodiment. In this embodiment, the IOP is a workstation controller to which a plurality of interactive workstations may be attached, it being understood that this invention could be practiced with other types of IOPs, including multi-function IOPs. The simulation script comprises a one-byte control block count field 302, one or more simulator control blocks 303–305, and one or more data stream scripts 310–319. Block count 302 indicates the number of simulator control blocks 303–305 in script 301. In the example of FIG. 3, three simulator control blocks 303–305 are contained in the script, and block count 302 is accordingly set to "3". Each simulator control block defines a single I/O device to be simulated. Each data stream script defines a simulated input data stream (in this case, simulated keystrokes) that the IOP will process as if received from the keyboard of an interactive workstation to generate an inbound data stream. The inbound data stream is then transmitted on a system I/O bus as if it originated from the interactive workstation. Multiple data stream scripts may be associated with each simulated I/O device. In the example of FIG. 3, four data stream scripts are associated with the first simulated I/O device, and three data stream scripts are associated with each of the other simulated I/O devices. In addition, control blocks associated with different simulated I/O devices may share one or more data stream scripts.

Figure 3B:
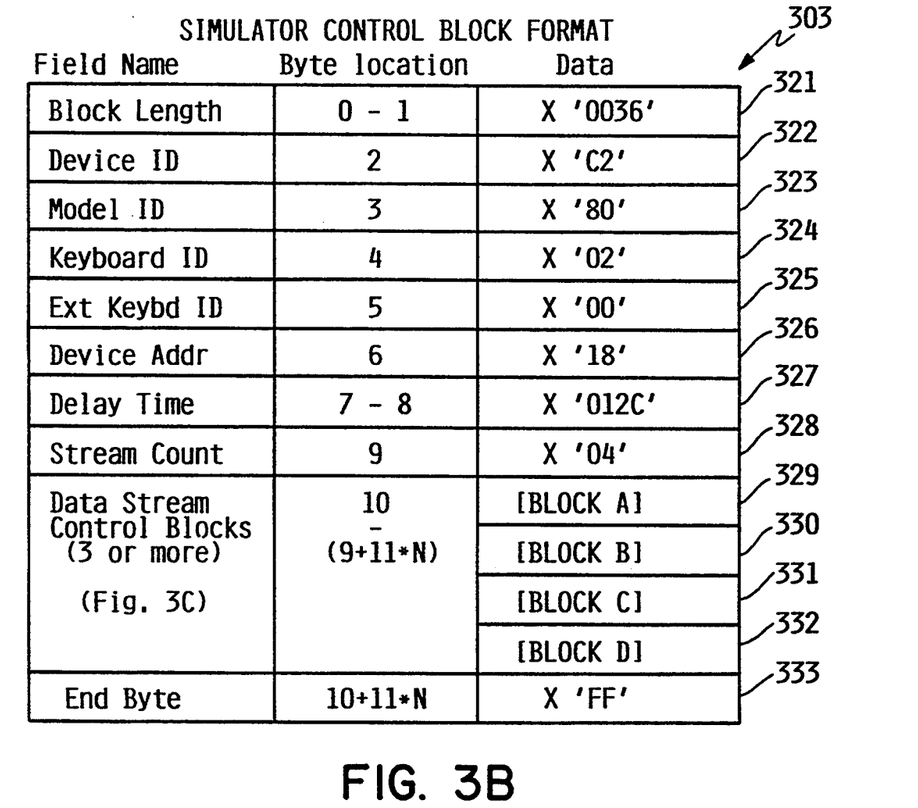
FIG. 3B shows the format of a typical simulator control block within the simulation script according to the preferred embodiment.

FIG. 3B shows the format of a typical simulator control block 303, which is part of simulation script 301. Simulator control block 303 comprises the fields described below. Block length field 321 (at byte locations 0-1) is a two-byte field containing the total length (in bytes) of the simulator control block. Device Id field 322 and model ID field 323 identify the type and model of the I/O device (in this case, a workstation) being simulated. Keyboard ID field 324 and extended keyboard ID field 325 identify the type of keyboard attached to the simulated workstation. Device address field 326 identifies the logical address within the IOP of the simulated workstation. The system-wide address of a workstation is a combination of the address of the IOP and the address within the IOP of the workstation. Delay time field 327 contains the delay time (in seconds) from the start of a simulation until the IOP is to begin executing the data stream scripts called out by the simulation control block. Stream count field 328 identifies the number of data stream control blocks contained in simulator control block 303. A variable number of data stream control blocks 329-332 (not fewer than three) follow stream count field 328. The data stream control blocks occupy byte locations 10 through (9+11*N), where N is the number of such control blocks, as shown. Each data stream control block 329-332 identifies a data stream script to be executed by the IOP. End byte 333 signals the end of simulator control block 303.

Figure 3C:
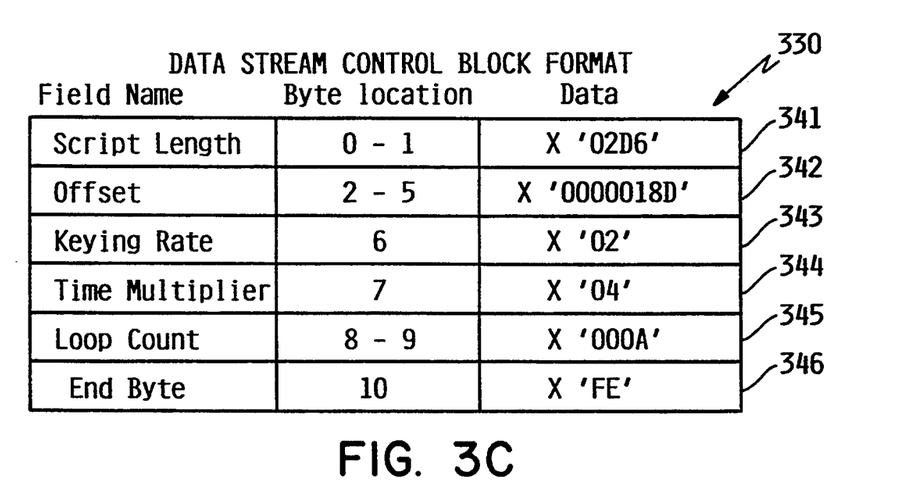
FIG. 3C shows the format of a typical data stream control block within the simulator control block according to the preferred embodiment.

FIG. 3C shows the format of a typical data stream control block 330, which is part of simulator control block 303. The data stream control block is used to identify the data stream script and control its execution. While each data stream control block is associated with a data stream script, it is possible for one data stream script to be shared by multiple control blocks, enabling multiple simulated I/O devices to use the same data stream script. In the example of FIG. 3C, data stream control block 330 is associated with data stream script 311. Data stream control block 330 comprises the fields described below. Script length field 341 identifies the length (in bytes) of the corresponding data stream script. Offset field 342 identifies the starting location of the data stream script in the simulation script record as an offset (in bytes) from the beginning of the record. Keying rate field 343 identifies the rate (in characters per second) at which keystrokes are to be simulated. Think time multiplier field 344 contains a multiplier used to calculate response times from the workstation (simulating thinking by the interactive user). Loop count field 345 indicates the number of times that the data stream script should be executed before continuing to the next script. End byte 346 signals the end of the data stream control block.

Figure 3D:
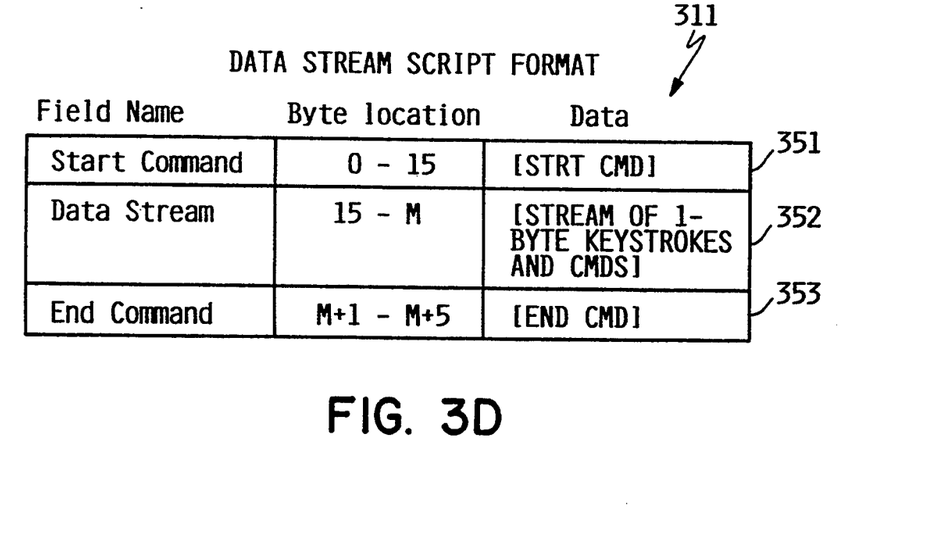
FIG. 3D shows the high-level format of a typical data stream script according to the preferred embodiment.

FIG. 3D shows the high-level format of a typical data stream script 311. The data stream script is a variable length stream of commands and individual bytes representing keystrokes. It is delimited by start command 351 and end command 353. Between the start command and end command may exist additional commands, but primarily the data stream portion 353 between the commands consists of individual bytes representing keystrokes from the simulated workstation. In the preferred embodiment, a think time command is defined for the data stream portion, which causes the IOP to insert a specified time delay in the data stream. The time delay specified in the command is multiplied by the think time multiplier specified in field 344 of the data stream control block.

Figure 3E:
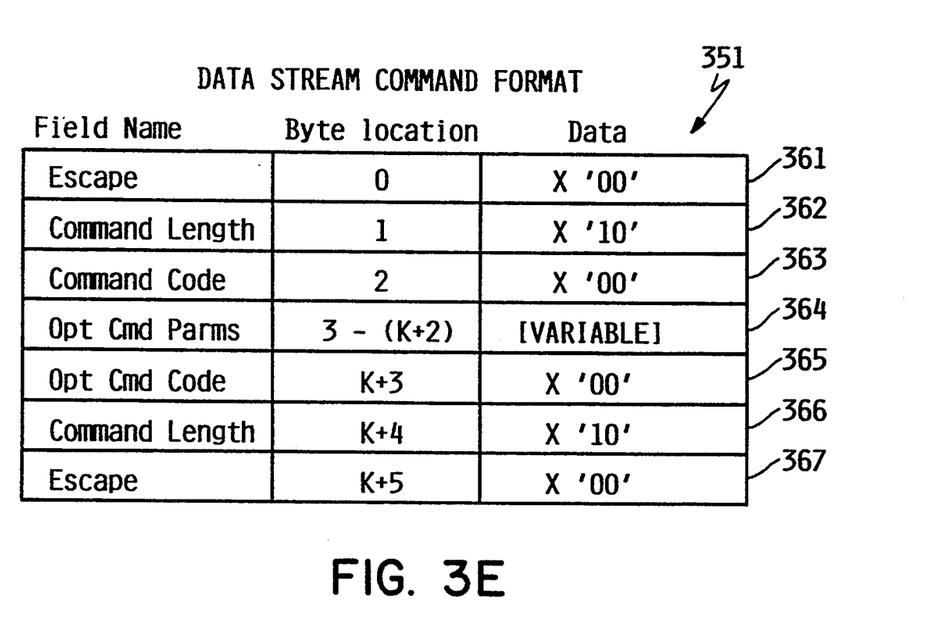
FIG. 3E shows the format of a data stream command contained in the data stream script according to the preferred embodiment.

FIG. 3E shows the format of a data stream command 351 contained in the data stream. The command comprises a 1-byte escape code to signal the start of the command 361, a length field 362 indicating the length (in bytes) of the command, a command code 363 identifying the command, a second length field 366 and 1-byte escape field 367. Fields 366 and 367 make the command a symmetric series of bytes, enabling it to be read either forward or backward. Command 351 optionally contains additional command parameters 364. Where additional parameters 364 are present, a second command code field 365 is necessary to maintain symmetry. In the example of FIG. 3E, the command is a start command, having 10 bytes of additional parameters specifying the data stream script length and identifier.

Figure 4:
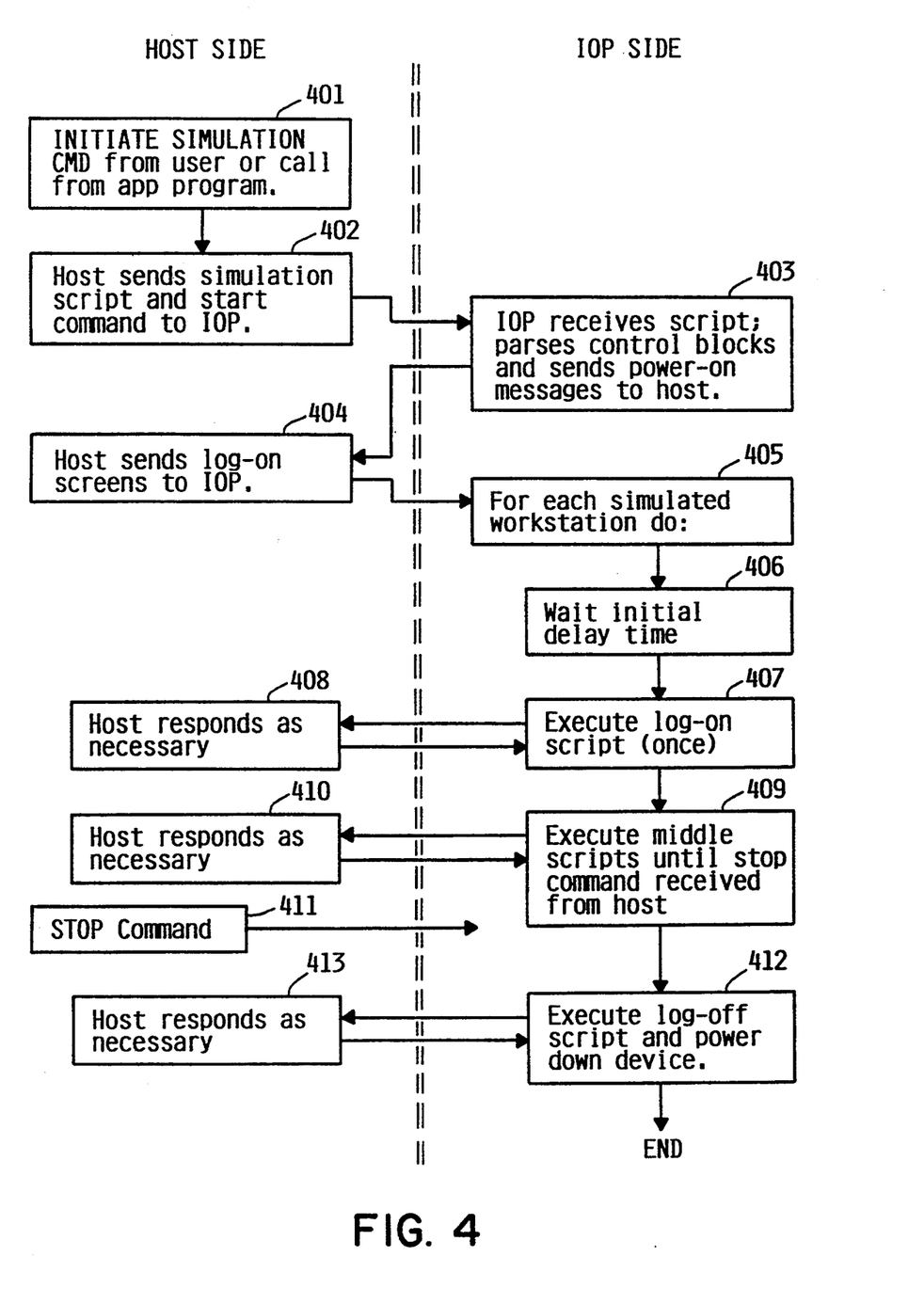
FIG. 4 is a high-level flowchart of the steps involved in simulating I/O devices according to the preferred embodiment.

The operation of the present invention according to the preferred embodiment will now be described. FIG. 4 is a high-level flowchart of the steps involved. A simulation is initiated from the host side of the system. Simulation may be initiated either by a call from an application program running on the host CPU or by a command entered from an interactive terminal (step 401). The simulation script 301 may be imbedded in the application program or may be a separate file. The application program or user who initiated a simulation may initiate simulations in multiple IOPs simultaneously, which may use the same or different simulation scripts. FIG. 4 shows the simulation steps only for a single IOP, it being understood that multiple IOPs could be performing the steps shown in FIG. 4 simultaneously.

For example, a capacity planning application program may test a hypothetical configuration and workload by calling one or more simulation scripts, executing the scripts and measuring the system response. In another example, a software developer developing a software module may command the IOPs to execute one or more simulation scripts while the software module is executing; the simulation scripts could merely provide typical background work for the system or may invoke the software module under test directly. In a further example, a system developer might use the system console to invoke simulations for debugging intermittent error conditions; once a simulation script can be constructed to induce the intermittent error, it can repeatably be induced any number of times, and the behavior of the system observed.

Upon initiation of the simulation, the host sends a command to the IOP to begin simulation, along with the simulation script (step 402). The script is stored somewhere on the host side of the system, which could be in main memory, disk storage or elsewhere, and is downloaded to the IOP via the system I/O bus. The IOP stores the script in its local memory 203 for the duration of the simulation. In the preferred embodiment, the simulation script is not kept in the IOP local memory 203 during normal operation, although that portion of the IOP's control program responsible for decoding the script and executing it is. The downloading of simulation scripts from the host permits greater flexibility in the content of the simulations, since it is possible for the host to store a variety of simulation scripts. However, in an alternative embodiment it would be possible to store a standard simulation script permanently in the IOP as part of its control program.

Upon receipt of simulation script 301, the IOP stores the script in local memory 203 and parses the various control blocks of the script (step 403). Script 301 will contain one or more simulator control blocks 303-305, each block corresponding to one I/O device to be simulated. The IOP will send a power-up message to the host for each simulated workstation. The power-up message informs the host that the interactive workstation has just been powered-up, and is awaiting instructions from the host. At the same time, the IOP allocates a screen buffer and field format table for each simulated workstation in its local memory. The host will normally respond by sending a log-on screen to the workstation, just as it would if a real workstation had powered-up (step 404).

The following described steps are executed separately for each simulated workstation. The IOP control program in effect has separate workstation sessions operating in parallel, just as it would for multiple real interactive workstations.

Upon receipt of each log-on screen, the IOP starts a timer for the simulated workstation to wait an initial delay time before executing a simulated log-on by an interactive user (step 406). The delay time is the time specified in delay time field 327 of simulator control block 303. Since a separate simulator control block 303 exists for each simulated device, it is possible to have different delay times, enabling staggered log-on of the simulated users.

After waiting the delay period, the control program in the IOP executes the first data stream script, which by convention is the log-on script (step 407). The log-on script is executed only once. The IOP executes the data stream script by decoding any imbedded commands in the script and taking appropriate action, by processing the stream of data bytes contained in the script as if the same were received from a real workstation to generate inbound data, and transmitting on the system I/O bus the inbound data streams thus generated from the script. For example, in the case of the log-on data stream script, the script would typically contain a start command 351, followed by a string of characters corresponding to the user's identifier, password, optional log-on parameters, and appropriate delimiters such as tab keys or enter keys (together constituting part 352), followed by an end command 353. Start and end commands 351, 353 are to be distinguished from commands received from the host; commands 351, 353 are used only as delimiters of the data stream script, not to command the IOP to take some particular action. The host responds to the log-on script in the normal manner (step 408), as if a real user were logging on to the system.

After executing the first (log-on) data stream script, the IOP executes the "middle" scripts in sequence (step 409). The middle scripts comprise all data stream scripts other than the first and last. As in the case of the log-on script, each middle script is executed by processing a stream of data bytes contained in the script, taking appropriate action for any imbedded commands, and transmitting to the host on the system I/O bus the outbound data streams generated as a result. For example, an imbedded command may require the IOP to pause a specified length of time in the middle of the data stream. The data stream script is repeated the number of times specified in loop count field 345 of data stream control block 330. When the IOP finishes executing a data stream script, it proceeds to the next script. When all middle data stream scripts have been executed, the IOP loops back to the first middle script (the second data stream script) and repeats the sequence. The middle data stream scripts are repeated indefinitely until a stop command is received from the host.

As in the case of the log-on script, the host responds as necessary to the various input streams received as a result of the middle data stream scripts (step 410). For example, a middle data stream script may produce inbound data streams to first call an editor program to edit a document, then make random character insertions and deletions in the document, and finally save the edited document. To each of these data streams, the host would respond, for example, by displaying the document initially, updating the document on the workstation display as alterations are made, and transmitting appropriate save messages to the workstation display. Note also that the data streams may cause various parts of the host to respond, as for example reading from and writing to disk storage as the document is initially called up and later saved.

When the IOP receives a command to stop simulation from the host (step 411), it completes processing of the current data stream script, then executes the final data stream script, which is a log-off script (step 412). After the host responds by acknowledging the log-off and returning the display to an idle state (step 413), the IOP sends a power-down message to the host indicating that the simulated workstation has been powered down. This completes the simulation.

Figure 5:
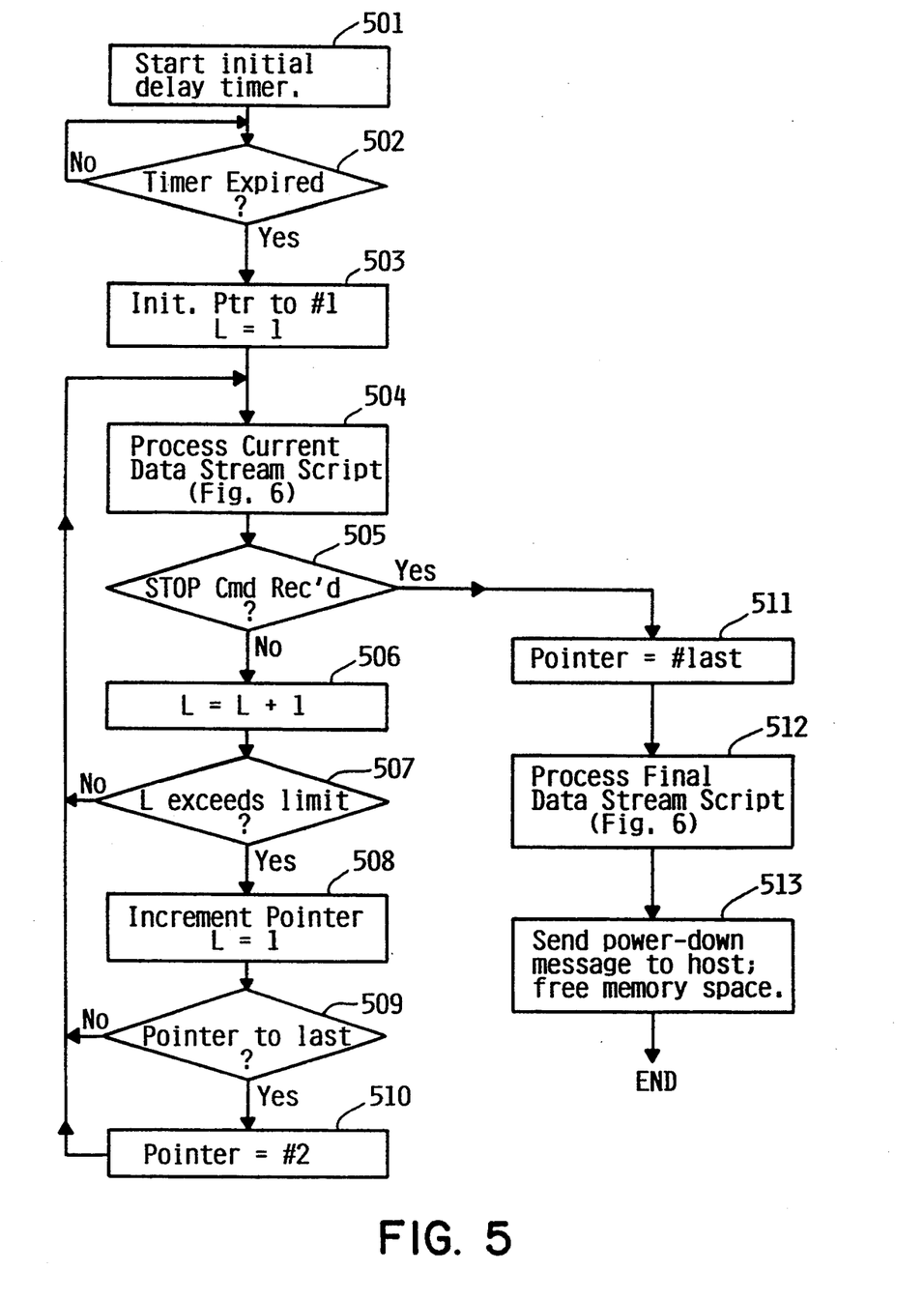
FIG. 5 is a flowchart of the steps performed by the IOP control program when simulating an I/O device according to the preferred embodiment.
Figure 6:
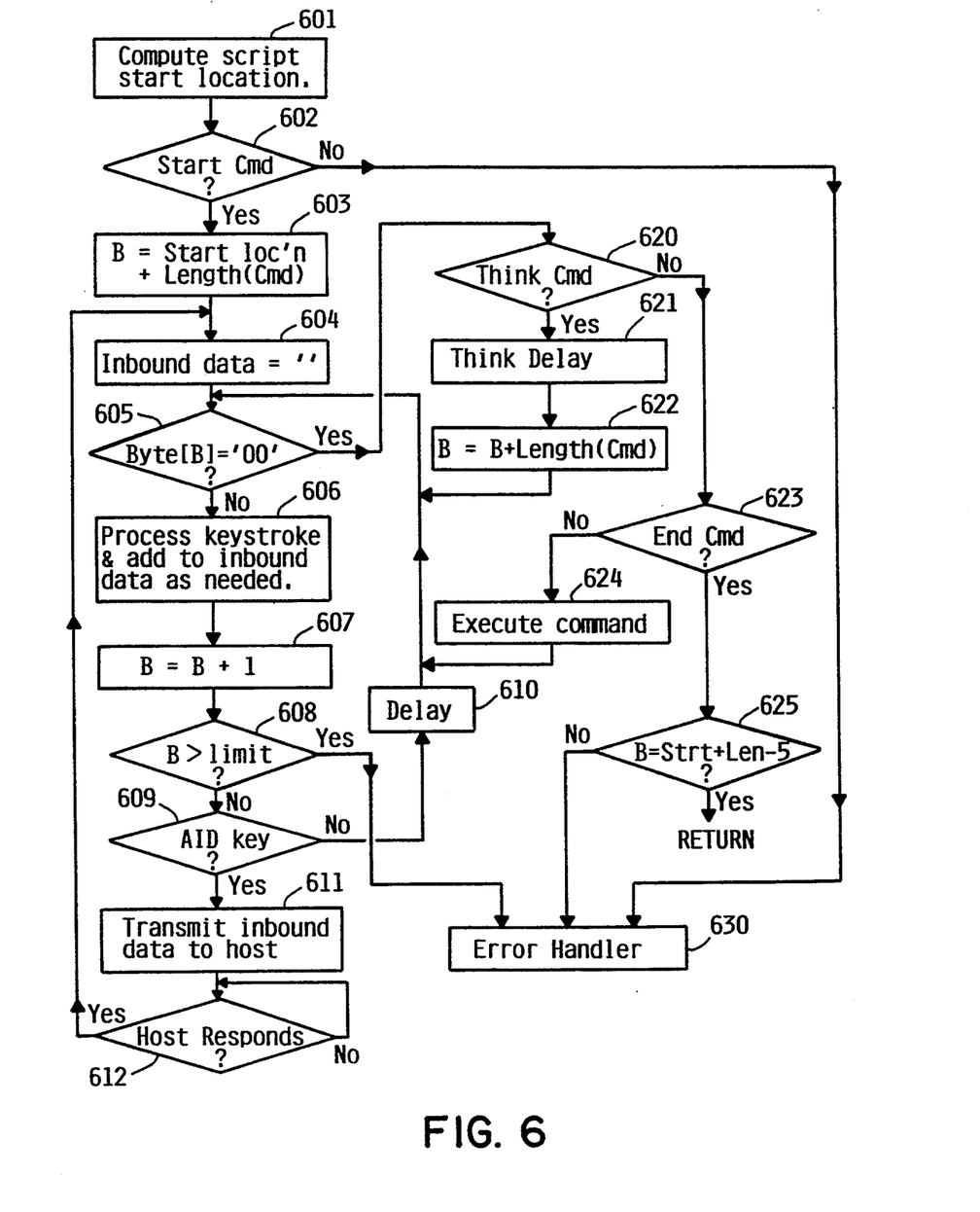
FIG. 6 shows the steps performed by the IOP control program when parsing a data stream script according to the preferred embodiment.

FIG. 5 shows in greater detail the steps performed by the IOP control program to simulate each workstation, which are represented in the high-level diagram of FIG. 4 as steps 405,406,407, 409,412. When the IOP receives acknowledgment of power-on from the host and the log-on display, it sets a timer to the delay value specified in field 327 (step 501). It then waits idle until the timer expires (step 502). Upon expiration of the timer, a pointer to the current data stream script is initialized to the first script and a loop counter is initialized to 1 (503). The IOP then processes the current data stream script by parsing the script, building inbound data streams to the host, transmitting the streams, and receiving the host's response (step 504). The details of processing a data stream script are shown in FIG. 6. When the data stream script has been fully processed, the IOP checks for the presence of a stop command from the host (step 505). If no stop command has been received, it then increments the loop count variable L (step 506) and checks whether L exceeds the loop count specified in field 345 (step 507); if not flow proceeds to step 504, where the data stream script is repeated. If the loop count has been reached, the current data stream pointer is incremented to the next data stream script and the loop count is reset to 1 (step 508). If the pointer now points to the last data stream script (step 509), the pointer is reset back to the second script (step 510). Flow then proceeds to step 504. If at step 505, it was determined that a stop command has been received, the current data stream script pointer is set to the last script (step 511), which is the log-off script, and the script is processed in the same manner as the previous scripts (step 512). The IOP then transmits a device power-down message and frees that part of dynamic RAM allocated to the screen buffer and field format table for the simulated device (step 513). When all simulating devices have powered-down, that part of dynamic RAM allocated to storage of the simulation script is freed.

FIG. 6 shows the steps performed by the IOP control program when parsing a data stream script. The program determines the location of the data stream script in local memory from the location of the simulation script record 301 and offset field 342 of the data stream control block (step 601). It then parses the first 16 characters, which should be a start command (step 602); if the first 16 characters are not a start command, an error condition is signalled (step 630). A byte pointer for identifying bytes within the data stream script is set to the starting location of the data stream script plus the length of the start command (step 603); this is the location immediately after the start command. The inbound data stream destined for the system I/O bus is initialized to blank (step 604).

The program then parses the data stream script one byte at a time. If the byte being parsed is not '00'X (step 605), it is processed in the same manner as a keystroke received from the workstation as if the workstation really existed (step 606). The IOP of the preferred embodiment maintains state information concerning the workstation display in its screen buffer and field format table. Certain keystrokes, such as cursor movement or tab keys, cause the IOP to update this state information without sending anything to the host. Other keystrokes, such as alphanumeric characters, are typically added to an inbound data stream to be sent to the host. However, the data stream is not sent immediately to host, but is sent following an Attention Identifier (AID) key, such as the "Enter" key or a function key. Still other keystrokes may cause the IOP to edit the inbound data stream, as in the case of a backspace or cursor movement followed by typing over a previously entered input field.

When the keystroke has been processed, the byte pointer is incremented (step 607), and the IOP verifies that the byte pointer does not exceed the bounds of the data stream script record (step 608). If the length has been exceeded, an error is indicated (step 630). If not, and the key just processed was not an AID key (step 609), the simulation program waits a period of time equal to 1/(keying rate specified in field 343) at step 610. This delay simulates a typical delay between keystrokes from an interactive user. It then goes to step 605 to parse the next byte of the data stream script.

If an AID key is processed (step 609), the inbound data stream is transmitted to the host on the system I/O bus (step 611). The IOP then waits for the host's response (step 612), which is typically the next display screen. When a response is received, flow reverts to step 604. Typically, a data stream script for a workstation will include a think time command immediately after an AID key.

If the byte being parsed at step 605 is '00'X, a command is indicated. In this case, the command code byte (field 363) is examined. If the command is a think time command (step 620), the simulation program waits the specified think time period multiplied by the time multiplier specified in field 344 (step 621), increments the byte pointer by the length of the command (step 622), and flow goes back to step 605. If the command is any other command except an "End" command (step 623), the command is executed (step 624) and flow reverts to step 605. Although only the start, end and think time command are defined in the embodiment described herein, numerous other commands are possible and may be defined as part of the simulation protocol. For example, a "percent jump" command could be defined, in which a branch to another location in the data stream script is taken a specified percentage of the times that the command is executed, the decision whether to take the jump in any particular case being made by generating a random number as is known in the art. Such a command has the advantage of introducing random effects into the simulation, which may be desirable in certain circumstances. As another example, a "call" command could be defined, in which another data stream script is called and executed, control returning to the original data stream script when an "end" command is encountered in the called data stream script.

If an "end" command was indicated at step 623, the program verifies proper location of the end command, which should be at starting location plus offset (field 342) plus length of data stream script (field 341) minus 5 (the length of an end command), at step 625. If an error in end command location was indicated at step 611, the program branches to handle the error (step 630). If the end command is in the proper location, the data stream script has been successfully processed, and the program returns to executed the next step shown in FIG. 5.

In the preferred embodiment described herein, the data contained in the data stream script represents data received by the IOP from the workstation. This data is processed by the IOP just as it would process data from a real workstation. Portions of the IOP behave exactly as they would for a real workstation. Screen buffers and field format tables are maintained, and the control program processes keystrokes that look like real data, thus achieving a truer simulation. However, in an alternative embodiment, the data stream script could represent inbound data to the host, in which case little or no processing of the data would be required by the IOP. In the case of certain types of workstations and IOPs, there is little difference between the data the IOP receives from the workstation and the data it transmits to the host. For example, ASCII workstations would typically require very little processing of the data from the data stream script in the IOP. It will be recognized by those skilled in the art that the present invention could easily be adapted to IOPs servicing ASCII workstations (in either block mode or raw mode).

Because the IOP processor and memory function for the most part in their normal manner when processing simulated data, it is possible for an IOP to service one or more real interactive workstations concurrently with simulation of one or more workstations. The IOP will maintain a separate screen buffer and field format table in local dynamic memory 204 for each workstation, real or simulated. The control program will process data from each workstation, real or simulated, in the same manner. The only difference will be that data from a real workstation will appear on I/O device interface 207, while simulated data will be injected into the processor by that part of the control program executing the simulation script.

In the preferred embodiment described herein, the simulation script is separated from the IOP control program which executes it. The IOP control program is generic, capable of executing many different simulation scripts. Since the control program does not contain the actual text of simulated data streams that will be sent to the host, it can be relatively compact as appropriate for storage in the limited space typically available in IOP local memory. Preferably, simulation scripts are stored on mass data storage, such as magnetic disk drives, until the simulation scripts are actually needed to run a simulation. When needed, a selected script will then be loaded into IOP local memory and executed as described herein. In an alternative embodiment, the text to be sent by the IOP to the host during simulation could be stored in the IOP local memory at all times, or could be stored in other storage devices available to the IOP. This text could be imbedded in a simulation control program or part of one or more separate simulation records.

In an additional alternative embodiment, it would not be necessary to maintain the control program portion responsible for executing simulation scripts in the IOP local memory during normal operation. In this embodiment, whenever a simulation is desired, a special simulation program could be loaded into local memory of the IOP, which may or may not contain the imbedded text of the data streams to be sent to the host to achieve simulation of I/O devices. This alternative would have the advantage of reducing the size of IOP local memory required to the extent of that part of the control program required for simulation execution, but would require additional complexity in the host operating system to support loading the different versions of IOP code, keeping track of which version is operating, etc.

The simulation script 301 is a record which may be created and transferred as any record in a computer system. It would, for example, be possible to create a simulation script with a general purpose file editor, although for large scripts this could prove somewhat tedious. In the alternative, a special purpose editor could be created which would provide interactive support for generating and editing the simulation script; e.g. default values for many of the simulation script fields could be provided automatically, field locations and lengths could be verified, etc., as is known in the art. As a further alternative, an application program could be created which would capture activity of a real I/O device during a sample interval and convert it to a simulation script.

Although a specific embodiment of the invention has been disclosed along with certain alternatives, it will be recognized by those skilled in the art that additional variations in form and detail may be made within the scope of the following claims.

What is claimed is:

1. A computer system comprising:
   a central processing unit;
   a system I/O bus coupled to said central processing unit; and
   an I/O processor assembly coupled to said system I/O bus for communicating with one or more I/O devices attached to said I/O processor assembly via a communications path independent of said system I/O bus, said I/O processor assembly comprising a programmable processor for controlling the operation of said I/O processor assembly and a local memory for storing instructions which execute on said programmable processor;
   wherein said I/O processor assembly has means for simulating an I/O device to said system I/O bus, said means comprising said programmable processor and said local memory, and further comprising:
   (a) means for receiving a simulation script from said system I/O bus, and
   (b) means for executing said simulation script to simulate an I/O device.

2. The computer system of claim 1, wherein said I/O processor assembly has means for simulating a plurality of I/O devices simultaneously, said means for simulating a plurality of I/O devices simultaneously comprising said programmable processor and said local memory.

3. The computer system of claim 1, further comprising:
   a real I/O device coupled to said I/O processor assembly via a communications path independent of said system I/O bus;
   wherein said means for simulating an I/O device comprises means for simulating an I/O device concurrently with servicing said real I/O device.

4. The computer system of claim 1, wherein said simulation script comprises a plurality of data bytes representing simulated input data and a plurality of imbedded commands.

5. The computer system of claim 1, wherein said means for executing said simulation script comprises a control program having a plurality of instructions stored in said local memory and which execute on said programmable processor.

6. A method for performing introspective tasks on a computer system, having a central processing unit, a system I/O bus, and an I/O processor assembly coupled to said system I/O bus, said I/O processor assembly for communicating with one or more I/O devices attached to said I/O processor assembly via a communications path independent of said system I/O bus, said method comprising the steps of:
   receiving a command being transmitted on said system I/O bus to simulate an I/O device, said command being received by said I/O processor assembly;
   generating a plurality of simulated data streams, said simulated data streams simulating data from said I/O device, said generating step being performed by said I/O processor assembly without assistance from a real I/O device; and
   transmitting said simulated data streams on said system I/O bus, said transmitting step being performed by said I/O processor assembly.

7. The method for performing introspective tasks on a computer system of claim 6, further comprising the step of:
   receiving output destined for said I/O device being simulated from said system I/O bus, said output being received by said I/O processor assembly.

8. The method for performing introspective tasks on a computer system of claim 6, wherein:
   said command received by said I/O processor assembly commands said I/O processor assembly to simulate a plurality of I/O devices simultaneously; and
   said generating and transmitting steps generate and transmit a plurality of simulated data streams, wherein said simulated data streams simulate data from said plurality of I/O devices simultaneously.

9. The method for performing introspective tasks on a computer system of claim 6, further comprising the step of:
   servicing, with said I/O processor assembly, a real I/O device coupled to said I/O processor assembly, wherein said servicing step is performed concurrently with said steps of generating and transmitting said simulated data streams.

10. A method for simulating real-time performance of a hypothetical computer system having a first number of I/O devices with a real computer system having a second number of I/O devices attached to one or more I/O processor assemblies, wherein said first number is greater than said second number, comprising the steps of:
- defining, with said real computer system, a plurality of I/O devices to be simulated by said real computer system;
- issuing a command in said real computer system, said command directed to an I/O processor assembly of said real computer system, to simulate said I/O devices to be simulated;
- simulating, with said I/O processor assembly, real-time behavior of said I/O devices to said real computer system,
- wherein said steps of defining a plurality of devices, issuing a command and simulating real-time behavior are performed as part of a capacity planning task executed by said real computer system, in which information concerning operational characteristics of said hypothetical system is used to perform said capacity planning task.

11. The method of claim 10, wherein said step of issuing a command comprises sending a simulation script to said I/O processor assembly, and said simulating step comprises executing said simulation script with said I/O processor assembly.

12. The method of claim 11, wherein said simulation script comprises a plurality of data bytes representing simulated input data and a plurality of imbedded commands.

13. A method for simulating real-time performance of a hypothetical computer system having a first number of I/O devices with a real computer system having a second number of I/O devices attached to one or more I/O processor assemblies, wherein said first number is greater than said second number, comprising the steps of:
- defining, with said real computer system, a plurality of I/O devices to be simulated by said real computer system;
- issuing a command in said real computer system, said command directed to an I/O processor assembly of said real computer system, to simulate said I/O devices to be simulated;
- simulating, with said I/O processor assembly, real-time behavior of said I/O devices to said real computer system,
- wherein said steps of defining a plurality of I/O devices, issuing a command, and simulating real-time behavior are performed as part of a software development task executed by said real computer system to develop a software module, in which information concerning operational characteristics of said hypothetical system executing said software module is used to perform said software development task.

14. The method of claim 13, wherein said step of issuing a command comprises sending a simulation script to said I/O processor assembly, and said simulating step comprises executing said simulation script with said I/O processor assembly.

15. An I/O processor assembly for coupling to a system I/O bus of a computer system, and for communicating with one or more I/O devices attached to said I/O processor assembly via a communications path independent of said system I/O bus, said I/O processor assembly comprising:
- a system I/O bus interface;
- a programmable processor coupled to said system I/O bus interface for controlling operation of said I/O processor assembly;
- a local memory for storing instructions which execute on said programmable processor, coupled to said programmable processor;
- means for receiving a command being transmitted on said system I/O bus via said system I/O bus interface to simulate an I/O device attached to said I/O processor, said means for receiving a command including means for receiving a simulation script being transmitted on said system I/O bus; and
- means, responsive to said means for receiving a command, for simulating said I/O device to said system I/O bus, said means for simulating said I/O device to said system I/O bus including means for executing said simulation script with said programmable processor.

16. The I/O processor assembly of claim 15, wherein said I/O processor assembly has means for simulating a plurality of I/O devices simultaneously, said means for simulating a plurality of I/O devices simultaneously including said programmable processor.

17. The I/O processor assembly of claim 15, wherein said means for simulating an I/O device comprises means for simulating an I/O device concurrently with servicing a real I/O device attached to said I/O processor assembly.

18. The I/O processor assembly of claim 15, wherein said simulation script comprises a plurality of data bytes representing simulated input data and a plurality of imbedded commands.

19. The I/O processor assembly of claim 15, wherein said means for executing said simulation script comprises a control program having a plurality of instructions stored in said local memory which execute on said programmable processor.

20. A computer system, said computer system having a first number of I/O devices attached to one or more I/O processor assemblies, said computer system comprising:
- means for defining a hypothetical computer system having a second number of I/O devices, said second number being greater than said first number, wherein at least one of said second number of I/O devices is a device to be simulated in real-time by said computer system;
- means for commanding an I/O processor assembly of said system to simulate said I/O device to be simulated;
- means in said I/O processor assembly, responsive to said means for commanding an I/O processor assembly of said system to simulate said I/O device to be simulated, for simulating the real-time behavior of said simulated I/O device to said computer system, thereby simulating the real-time behavior of said hypothetical computer system.

21. The computer system of claim 20, wherein said means for commanding an I/O processor assembly to simulate an I/O device comprises means for transmitting a simulation script to said I/O processor assembly, and said means for simulating the real-time behavior of said simulated I/O device comprises means for executing said simulation script.

22. The computer system of claim 21, wherein said simulation script comprises a plurality of data bytes representing simulated input data and a plurality of imbedded commands.

* * * * *